United States Patent
Yu et al.

(10) Patent No.: US 11,244,668 B2
(45) Date of Patent: Feb. 8, 2022

(54) DEVICE AND METHOD FOR GENERATING SPEECH ANIMATION

(71) Applicant: TCL RESEARCH AMERICA INC., San Jose, CA (US)

(72) Inventors: Zixiao Yu, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 0 days.

(21) Appl. No.: 16/888,150

(22) Filed: May 29, 2020

(65) Prior Publication Data

US 2021/0375260 A1  Dec. 2, 2021

(51) Int. Cl.
| | |
|---|---|
| G10L 15/02 | (2006.01) |
| G10L 25/24 | (2013.01) |
| G10L 25/30 | (2013.01) |
| G10L 13/047 | (2013.01) |

(52) U.S. Cl.
CPC ............ *G10L 13/047* (2013.01); *G10L 15/02* (2013.01); *G10L 25/24* (2013.01); *G10L 25/30* (2013.01); *G10L 2015/025* (2013.01)

(58) Field of Classification Search
CPC .......... G10L 15/02; G10L 25/24; G10L 25/30
See application file for complete search history.

(56) References Cited

U.S. PATENT DOCUMENTS

| | | | | |
|---|---|---|---|---|
| 10,699,705 | B2* | 6/2020 | Li | G10L 15/063 |
| 11,113,859 | B1* | 9/2021 | Xiao | G06T 15/005 |
| 2015/0161994 | A1* | 6/2015 | Tang | G10L 15/063 |
| | | | | 704/232 |
| 2015/0371631 | A1* | 12/2015 | Weinstein | G10L 15/08 |
| | | | | 704/256.4 |
| 2017/0053644 | A1* | 2/2017 | Rennie | G10L 15/16 |
| 2018/0253881 | A1* | 9/2018 | Edwards | G10L 21/10 |
| 2018/0336465 | A1* | 11/2018 | Kim | G06N 7/005 |
| 2020/0286471 | A1* | 9/2020 | Singh | G10L 15/24 |
| 2021/0192283 | A1* | 6/2021 | Guo | G06N 20/00 |
| 2021/0193161 | A1* | 6/2021 | Delcroix | G10L 15/16 |
| 2021/0233299 | A1* | 7/2021 | Zhou | G10L 25/30 |

OTHER PUBLICATIONS

Sainath, T. N., Vinyals, O., Senior, A., & Sak, H. (Apr. 2015). Convolutional, long short-term memory, fully connected deep neural networks. In 2015 IEEE international conference on acoustics, speech and signal processing (ICASSP) (pp. 4580-4584). IEEE.*

* cited by examiner

*Primary Examiner* — Bryan S Blankenagel

(74) *Attorney, Agent, or Firm* — Anova Law Group, PLLC

(57) ABSTRACT

A method for generating speech animation from an audio signal includes: receiving the audio signal; transforming the received audio signal into frequency-domain audio features; performing neural-network processing on the frequency-domain audio features to recognize phonemes, wherein the neural-network processing is performed using a neural network trained with a phoneme dataset comprising of audio signals with corresponding ground-truth phoneme labels; and generating the speech animation from the recognized phonemes.

14 Claims, 11 Drawing Sheets

DEVICE AND METHOD FOR GENERATING SPEECH ANIMATION

TECHNICAL FIELD

The present disclosure relates to the technical field of animation generation, in particular to a device and a method for generating speech animation.

BACKGROUND

Virtual characters have been very popular nowadays in streaming video, gaming, and virtual reality related applications. These characters communicate with each other in a virtual world, and sometimes they interact with the viewers or players in the physical world. Human beings are very sensitive to any facial artifacts, uncoordinated or unsynchronized performance of virtual characters, which make facial animation, in particular speech animation production, very challenge since animation simultaneously involves voice and mouth movement.

In realistic speech animation, artists seek the most immersive experiences with high-fidelity human-like virtual characters. However, the high cost involved in the production process as well as the huge data requirements, including audio, video, and possible 3D models, significantly undermine its scaling potential. For applications that accept lower realism effects but requires good scaling possibility, for example, avatar-based online conferences, audio data could become the only media that is available during the process. In such a scenario, the virtual characters are required to behave properly with mimic mouth movement matching with the voice input seamlessly, this is what we called believable speech animation. The "believable" speech animation requires that the algorithm works, under practical resource constraints, for all possible virtual faces with various 3D models and produces synthesized video with sufficient realism for users on the remote end to feel comfortable.

Real-time speech animation is a compelling but challenging topic, where multimodal inputs such as audio, video, or depth information, have been considered to leverage performance. However, in conditions that audio is the only available input, due to resource limitation or privacy concerns, the quality of the outcome relies heavily on the real-time phoneme recognition, such as recognition accuracy and latency. For real-time applications, to find the balance between latency and accuracy is very critical. The problem at hand is to find a phoneme recognition solution that can achieve the best accuracy with reasonably low latency for real-time animation.

SUMMARY

In one aspect of the present disclosure, a method for generating speech animation from an audio signal is provided. The method includes: receiving the audio signal; transforming the received audio signal into frequency-domain audio features; performing neural-network processing on the frequency-domain audio features to recognize phonemes, wherein the neural-network processing is performed using a neural network trained with a phoneme dataset comprising of audio signals with corresponding ground-truth phoneme labels; and generating the speech animation from the recognized phonemes.

In certain embodiments, transforming the audio signal into frequency-domain audio features includes: calculating mel-frequency cepstral coefficients (MFCCs) of the audio signal; calculating a first and a second derivative components of the MFCCs and aggregating the first and second derivative components into a single audio feature frame; and generating the audio features by aggregating the single audio feature frame with forward and backward contextual vectors of the single audio feature frame.

In certain embodiments, performing neural-network processing on the frequency-domain audio features to recognize phonemes includes: applying convolutional neural network (CNN) filters on the audio features to generate a plurality of sets of intermediate features, each set of intermediate features corresponding to one of a plurality of CNN output channels; applying parallel temporal modeling on the intermediate features using a plurality of long short-term memory (LSTM) networks to generate LSTM stack block (LSB) output features, wherein each LSTM network is applied to one set of intermediate features to generate a set of LSB output features; applying unified temporal modeling using a unified LSTM network to the LSB output features to generate unified LSTM output features; applying a fully connected layer (FCL) to the unified LSTM output features to generate hidden Markov models (HMM) tied-states; and applying an HMM tri-phone decoder to the HMM tied-states to generate recognized phoneme labels.

In certain embodiments, the method further includes: storing the audio features in a first storage buffer; storing the HMM tied-states in a second storage buffer; and storing the recognized phonemes in a third storage buffer; wherein the first storage buffer, the second storage buffer, and the third storage buffer are fixed size first in first out (FIFO) buffers.

In certain embodiments, the method further includes: generating a first combined feature by combining the single audio feature frame with the LSB output features; and using the first combined feature as input to the unified LSTM network to generate the unified LSTM output features.

In certain embodiments, the method further includes: generating a second combined feature by combining the LSB output features with the unified LSTM output features; and using the second combined feature as input to the FCL to generate the HMM tied states.

In certain embodiments, generating the speech animation from the recognized phonemes includes: generating a 2-dimensional (2D) viseme field and dividing the 2D viseme field into a plurality of blocks, wherein each recognized phoneme corresponds to a block of the 2D viseme field.

In another aspect of the present disclosure, a device for generating speech animation from an audio signal is provided. The device includes a memory, storing computer-executable instructions; and a processor, coupled with the memory and, when the computer-executable instructions being executed, configured to: receive the audio signal; transform the received audio signal into frequency-domain audio features; perform neural-network processing on the frequency-domain audio features to recognize phonemes, wherein the neural-network processing is performed using a neural network trained with a phoneme dataset comprising of audio signals with corresponding ground-truth phoneme labels; and generate the speech animation from the recognized phonemes.

In certain embodiments, the processor is further configured to: calculate mel-frequency cepstral coefficients (MFCCs) of the audio signal; calculate a first and a second derivative components of the MFCCs and aggregating the first and second derivative components into a single audio feature frame; and generate the audio features by aggregating the single audio feature frame with forward and backward contextual vectors of the single audio feature frame.

In certain embodiments, the processor is further configured to: apply convolutional neural network (CNN) filters on the audio features to generate a plurality of sets of intermediate features, each set of intermediate features corresponding to one of a plurality of CNN output channels; apply parallel temporal modeling on the intermediate features using a plurality of long short-term memory (LSTM) networks to generate LSTM stack block (LSB) output features, herein each LSTM network is applied to one set of intermediate features to generate a set of LSB output features; apply unified temporal modeling using a unified LSTM network to the LSB output features to generate unified LSTM output features; apply a fully connected layer (FCL) to the unified LSTM output features to generate hidden Markov models (HMM) tied-states; and apply an HMM tri-phone decoder to the HMM tied-states to generate recognized phoneme labels.

In certain embodiments, the processor is further configured to: store the audio features in a first storage buffer; store the HMM tied-states in a second storage buffer; and storing the recognized phonemes in a third storage buffer; wherein the first storage buffer, the second storage buffer, and the third storage buffer are fixed size first in first out (FIFO) buffers.

In certain embodiments, the processor is further configured to: generate a first combined feature by combining the single audio feature frame with the LSB output features; and use the first combined feature as input to the unified LSTM network to generate the unified LSTM output features.

In certain embodiments, the processor is further configured to: generate a second combined feature by combining the LSB output features with the unified LSTM output features; and use the second combined feature as input to the FCL to generate the HMM tied states.

In certain embodiments, the processor is further configured to: generate a 2-dimensional (2D) viseme field and dividing the 2D viseme field into a plurality of blocks, wherein each recognized phoneme corresponds to a block of the 2D viseme field.

In another aspect of the present disclosure, a non-transitory computer-readable storage medium is provided. The storage medium stores a plurality of instructions, wherein when the plurality of instructions are executed by a processor, cause the processor to: receive the audio signal; transform the received audio signal into frequency-domain audio features; perform neural-network processing on the frequency-domain audio features to recognize phonemes, wherein the neural-network processing is performed using a neural network trained with a phoneme dataset comprising of audio signals with corresponding ground-truth phoneme labels; and generate the speech animation from the recognized phonemes.

In certain embodiments, the plurality of instructions further cause the processor to: calculate mel-frequency cepstral coefficients (MFCCs) of the audio signal; calculate a first and a second derivative components of the MFCCs and aggregating the first and second derivative components into a single audio feature frame; and generate the audio features by aggregating the single audio feature frame with forward and backward contextual vectors of the single audio feature frame.

In certain embodiments, wherein the plurality of instructions further cause the processor to: apply convolutional neural network (CNN) filters on the audio features to generate a plurality of sets of intermediate features, each set of intermediate features corresponding to one of a plurality of CNN output channels; apply parallel temporal modeling on the intermediate features using a plurality of long short-term memory (LSTM) networks to generate LSTM stack block (LSB) output features, wherein each LSTM network is applied to one set of intermediate features to generate a set of LSB output features; apply unified temporal modeling using a unified LSTM network to the LSB output features to generate unified LSTM output features; apply a fully connected layer (FCL) to the unified LSTM output features to generate hidden Markov models (HMM) tied-states; and apply an HMM tri-phone decoder to the HMM tied-states to generate recognized phoneme labels.

In certain embodiments, the plurality of instructions further cause the processor to: store the audio features in a first storage buffer; store the HMM tied-states in a second storage buffer; and store the recognized phonemes in a third storage buffer; wherein the first storage buffer, the second storage buffer, and the third storage buffer are fixed size first in first out (FIFO) buffers.

In certain embodiments, the plurality of instructions further cause the processor to: generate a first combined feature by combining the single audio feature frame with the LSB output features; and use the first combined feature as input to the unified LSTM network to generate the unified LSTM output features.

In certain embodiments, the plurality of instructions further cause the processor to: generate a second combined feature by combining the LSB output features with the unified LSTM output features; and use the second combined feature as input to the FCL to generate the HMM tied states.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some embodiments of the present disclosure. Other drawings may be obtained by those of ordinary skill in the art based on these drawings.

DETAILED DESCRIPTION

Figure 1:
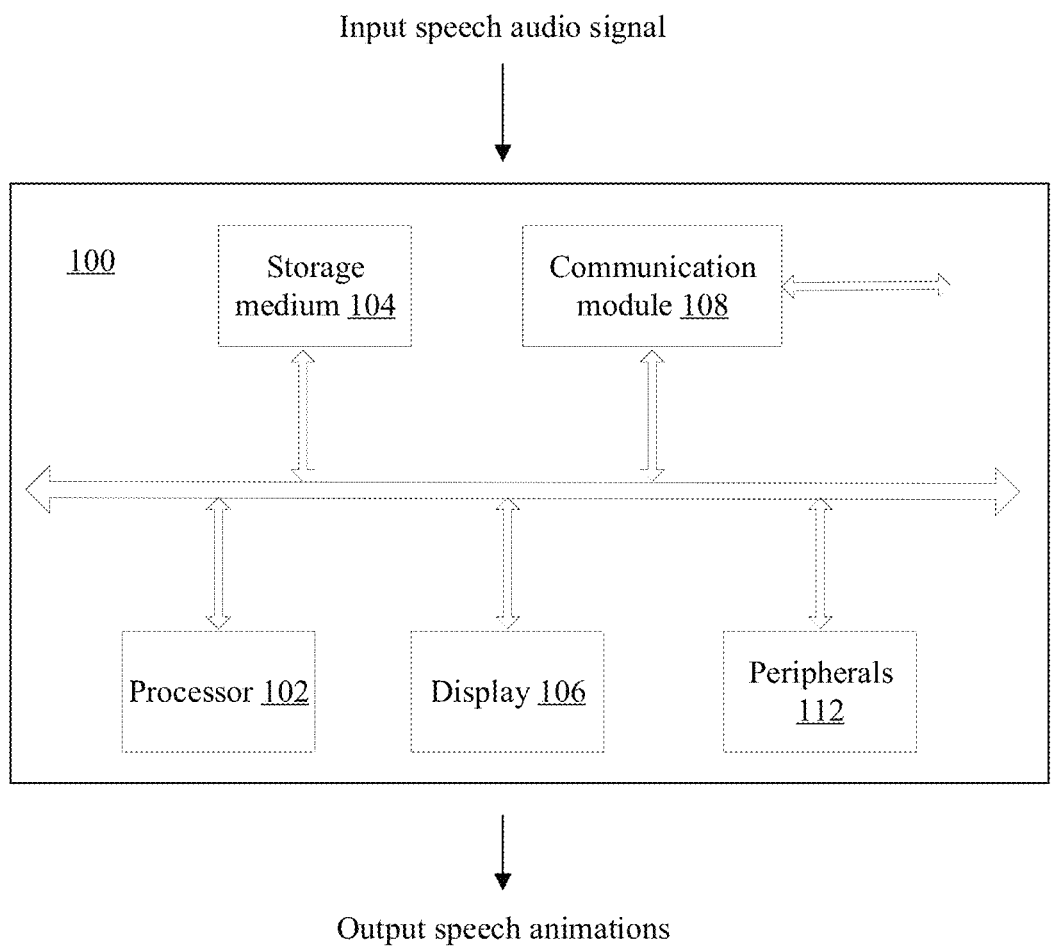
FIG. 1 illustrates a speech animation generation device according to certain embodiments of the present disclosure.

The technical solutions according to the embodiments of the present disclosure described in the following with reference to the accompanying drawings. The described embodiments are only part of the embodiments of the present disclosure, but not all the embodiments. All other embodiments obtained by a person of ordinary skill in the art based on the embodiments of the present disclosure without creative efforts are within the scope of the present disclosure.

Some recent works demonstrate that believable speech animation is achievable. In certain works, the audio input is segmented into small pieces called frames, and fundamental frequency features are extracted from each frame. Phonemes, which are perceptually distinct units of sound in a specified language that distinguish one word from another, are predicted by recognizing vowels and basic fricative consonants from the features, and then mapped into the corresponding static animation called viseme (the phonemes' counterparts in the visual domain). In this frame-based processing mechanism, the latency is negligible as it almost equals to the processing time of a single frame. However, lack of considering on neighborhood context information during the process significantly limited the recognition accuracy of the phoneme as the system can only recognize basic phonemes, which contributed directly to the low quality of the generated animation. In certain other works, a word-based processing mechanism was adopted to achieve higher quality animation. By utilizing the force alignment approach, phoneme transcription can be extracted corresponding to an audio chunk that contains several words in reasonably high accuracy. With considering the neighboring phonemes natural transition, the so called viseme coarticulation problem is addressed. In addition, a group of richer phonemes (around 39 different phonemes) has been considered and compared to the fundamental phonemes (below 10 different phonemes) in certain works, which directly contribute to a better quality of the generated animation. However, on the downside, the latency of word-level duration becomes unacceptable for real-time applications. Hence, if a midway between frame-based and word-based approaches can be found, for example, using a slide-window of frames in processing and a suitable phoneme recognition algorithm for the richer phoneme set with acceptable accuracy, the problem of real-time believable speech animation might be resolved.

With the latest advances in deep learning, the phoneme recognition topic has been revisited using completely new methodologies. Compared with the traditional models, such as Hidden Markov models (HMM) (error rate 26.61% as demonstrated in certain works), HMM/conditional random fields (CRFs) (error rate 25.24% as demonstrated in certain works), these deep-learning neural network (DNN) based approaches may decrease the predicted phoneme error rate by 10%. In certain works, a feed-forward deep neural network model was proposed and achieved an error rate of 23.71%. The system used 39 Mel-frequency cepstral coefficients (MFCCs) of 11 consecutive frames (each standard audio frame is 25 ms with 15 ms overlap) as input to predict each phoneme label. In another work, it was reported that a feed-forward deep neural network architecture achieved a lower error rate of 16.49%, and a 4 layers standard Long short-term memory (LSTM) network achieved an even lower error rate of 15.02%. In certain works, a network architecture called CLDNN that combines Convolutional Neural Network (CNN), LSTM and fully connected DNN was proposed. It was demonstrated to further improve the performance of 4-6% compare to the LSTM.

For real-time applications, to find the balance between latency and accuracy is very critical as indicated in the design philosophy of Recurrent Neural Network (RNN) and LSTM. The temporal correlation between neighbor audio frames can play very significant roles in recognition accuracy improvement. However, the phoneme recognition accuracy improvement achieved by adding more neighbor frames in the sliding window is at the cost of latency. Therefore, the problem at hand is to find a phoneme recognition solution that can achieve the best accuracy with reasonably low latency for real-time animation.

The present disclosure provides a device and a method for generating speech animation from an audio input containing speech signals. According to certain embodiments, the device and method provided by the present disclosure adopt a novel deep network architecture, termed as real-time phoneme recognized network (RealPRNet), to address existing problems in speech animation generated based on audio signals. With a designed network architecture that considers both temporal and spatial correlations, RealPRNet may predict phoneme stream for a sliding window of audio frames input. According to certain embodiments, a LSTM Stack Block (LSB) may be adopted to maximize the learning efficiency of the temporal-spatial patterns. The LSB may include multi-parallel LSTM layers. After CNN filters learn the spatial correlation between frequency features in the input signal, temporal modeling may be performed by two modules, including separate temporal modeling by LSB and unified temporal modeling by a unified LSTM layer. In certain embodiments of implementing RealPRNet, the CNN is not directly connected to LSTMs. During the training progress, each different CNN filter may learn to emphasize different frequency-time patterns in the input features. The LSB may further exploit the temporal correlation with different emphasized frequency-time patterns and separately processes intermediate output features from different CNN filters. Each output feature will be passed to an individual LSTM network in the LSB. The outputs from LSB may be aggregated and passed to a subsequent unified LSTM network and output DNN layers. These strategies may improve performance of the speech animation generation method.

FIG. 1 illustrates a speech animation generation device 100 according to certain embodiments of the present disclosure. As shown in FIG. 1, the speech animation generation device 100 may be configured to receive an audio signal. In certain embodiment, the received audio signal may be a digitized speech signal. The speech audio signal may be obtained from a recording device, loaded from a memory module, or otherwise provided to the speech animation generation device 100. The speech animation generation device 100 may be configured to perform a neural network processing to convert the audio input into a recognized phoneme sequence and generate a facial animation based on the recognized phoneme. In certain embodiments, parameters of the neural network may be generated by a training process configured to receive training data containing a plurality of audio signals and ground-truth phoneme annotations.

In certain embodiments, the speech animation generation device 100 may be a computing device including a processor 102 and a storage medium 104. The speech animation generation device 100 may further include a display 106, a communication module 108, and additional peripheral devices 112. Certain devices may be omitted, and other devices may be included. Processor 102 may include any appropriate processor(s). In certain embodiments, processor 102 may include multiple cores for multi-thread or parallel processing. Processor 102 may execute sequences of computer program instructions to perform various processes, such as a neural network processing program. Storage medium 104 may be a non-transitory computer-readable storage medium, and may include memory modules, such as ROM, RAM, flash memory modules, and erasable and rewritable memory, and mass storages, such as CD-ROM, U-disk, and hard disk, etc. Storage medium 104 may store computer programs and instructions for implementing various processes, when executed by processor 102, cause the processor to perform various steps of the neural network processing program of a speech animation generation method for generating speech animation from the input audio signal. The communication module 108 may include network devices for establishing connections through a network. Display 106 may include any appropriate type of computer display device or electronic device display (e.g., CRT or LCD based devices, touch screens). In certain embodiments, the peripheral devices 112 may include an audio receiving and recording device, such as a microphone. The peripherals 112 may further include additional I/O devices, such as a keyboard, a mouse, and so on. The processor 102 may be configured to execute instructions stored on the storage medium 104 and perform various operations related to the speech animation generation method as detailed in the following descriptions.

Figure 2:
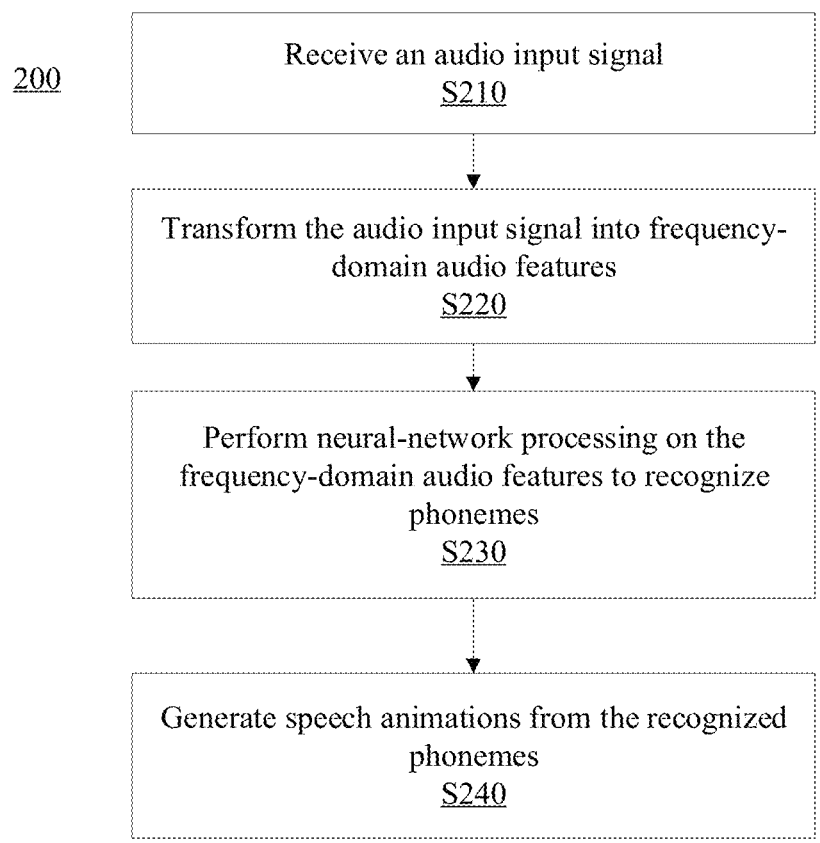
FIG. 2 illustrates a speech animation generation method for generating speech animation from an input audio signal according to certain embodiments.
Figure 3:
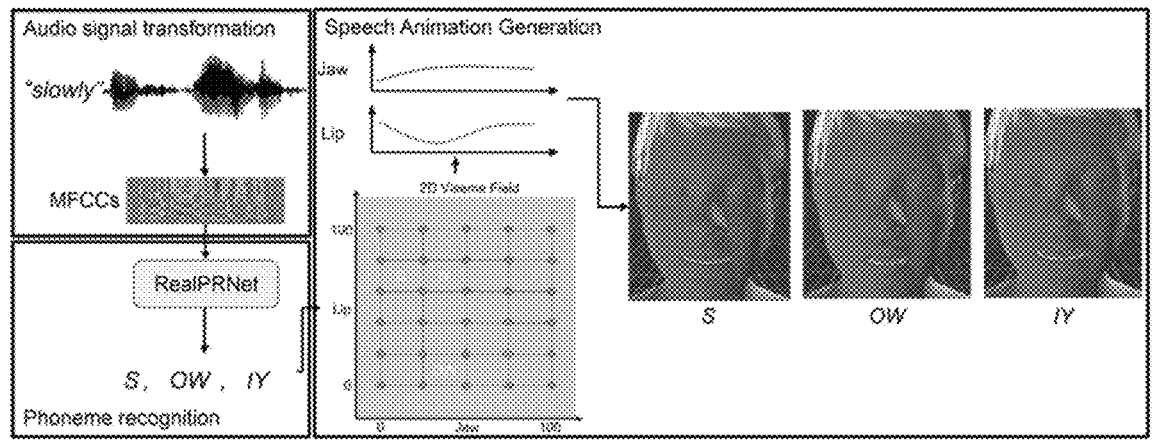
FIG. 3 illustrates an overview of a speech animation generation method for generating speech animation from an input audio signal corresponding to a phoneme stream of {S, OW, IY} of vocabulary /slowly/.
Figure 4:
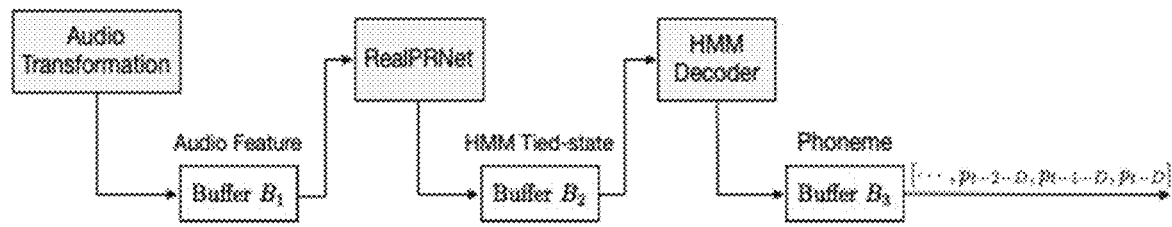
FIG. 4 illustrates a phoneme recognition process with buffers according to certain embodiments of the present disclosure.

FIG. 2 illustrates a speech animation generation method 200 for generating speech animation from an input audio signal according to certain embodiments. FIG. 3 and FIG. 4 illustrate certain aspects of the speech animation generation method 200 according to certain embodiments. According to certain embodiments, the speech animation generation method 200 may provide a real-time process that recognizes a phoneme stream from an audio input, and maps the phoneme stream to a corresponding parameter stream and drives 3D facial models.

Viseme is the visual mouth shape representation that has been widely used in speech recognition and animation, as it can be mapped directly from the phoneme (but not vice versa, as multiple phonemes may be mapped to the same viseme if they have similar mouth shapes during the pronunciation, such as /b/ and /p/). It is important to realize that so far there is no common standard to regulate the viseme classes, for example, certain systems used 20 different visemes, while others used 26 different visemes, and yet others used 16 visemes, etc.

As shown in FIG. 2, the speech animation generation method 200 may include the following exemplary steps. Step S210 is to receive an audio input signal. In certain embodiments, the audio input signal may be a digitized speech signal. The audio input signal may be obtained from a recording device, loaded from a memory module, or otherwise provided. In certain embodiments, the speech animation generation method 200 may process the input audio signal in real time to produce real-time speech animations synchronized with the speech signal.

Step S220 is to transform the audio input signal into frequency-domain audio features. When the raw audio input signals are received, they may be transformed into frequency-domain signals. In certain embodiments, mel-frequency cepstral coefficients (MFCCs) are calculated from the audio input signal. The MFCCs are widely used in audio processing. They collectively make up a mel-frequency cepstrum (MFC), which represents a short-term power spectrum of an audio signal. It is observed that the human voice is a combination of sound waves at different frequencies. The MFCCs may balance the variation of the sound change at different frequencies levels.

The audio input signal includes a plurality of frames. For example, in certain exemplary embodiments, there are 100 frames per second in the input audio and each audio frame is 25 ms length with 15 ms overlap. The number, length, and overlap duration of audio frames may be varied in certain other embodiments and are not limited in this disclosure.

For each audio frame, the first and the second derivative components of the MFCCs may be aggregated to a vector that represents a single audio feature frame, f. An audio feature $x_t$ at time t may be configured to correspond to the audio feature $f_t$ at time t and $f_t$'s forward and backward contextual vectors, denoted as $[f_{t-n}, \ldots, f_t, \ldots, f_{t+m}]$. The value n represents the number of audio frames before time t, and the value m represents the number of future audio frames. The integrated audio feature $x_t$ is used to predict the phoneme label at time t. Thus, the value selection of m directly impacts the latency with 10 m ms with 100 frames per second frame rate. The greater the value of m the better potential recognition accuracy but longer latency. When m=0, no future frames are buffered to introduce additional latency. However, the potential advantages of context information have been taken to improve the phoneme recognition performance.

Step S230 is to perform neural-network processing on the frequency-domain audio features to recognize phonemes. In certain embodiments, parameters of the neural network may be generated by a training process configured to receive training data containing a plurality of audio signals and ground-truth phoneme annotations. According to certain embodiments, phoneme recognition may be conducted using a real-time phoneme recognized network (RealPRNet) and a hidden Markov model (HMM) tri-phone decoder. The RealPRNet may leverage different neural networks such as CNN and LSTM. The output of the RealPRNet may be an HMM tied-state H, which may be used as input of the decoder to calculate recognized phoneme P.

In order to produce a smooth animation, the phoneme recognition process may be required to output predicted phonemes with a constant time interval of A ms. Thus, in certain embodiments, a buffer mechanism may be adopted. FIG. 4 illustrates the phoneme recognition process with buffers according to certain embodiments. The buffers used in the process and illustrated in FIG. 4 may be fixed-size first in first out (FIFO) buffers.

Figure 5:
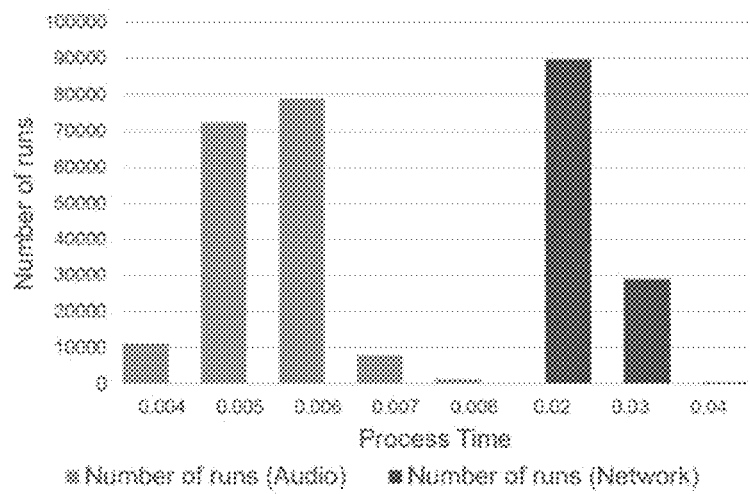
FIG. 5 illustrates audio feature transformation time consumption distribution according to certain embodiments of the present disclosure.

As shown in FIG. 4, after the audio input signal is transformed into frequency-domain audio features $f_t$ every A ms of time interval (equal to the sampling interval), $f_t$ is stored in the input feature buffer $B_1$. The calculation of raw audio signal to audio features transformation process may cause a first delay $d_1+e_1$ where $d_1$ is median calculation time and $e_1$ is fluctuation time. According to experiments, time consumption by the process of frequency-domain audio feature transformation is typically stable and 100% less than A ms. FIG. 5 illustrates audio feature transformation time consumption distribution. As shown in FIG. 5, time consumption by the process of frequency-domain audio feature transformation is 100% less than A ms (10 ms in the experiment shown in FIG. 5).

The audio features in $B_1$ may then be used to construct audio feature vector $x_t$, which includes audio feature $f_t$ at time t and $f_t$'s forward and backward contextual vectors, denoted as $[f_{t-n}, \ldots, f_t, \ldots, f_{t+m}]$. The size of $B_1$ may depend on two factors: (1) selected values m and n, and (2) RealPRNet time consumption $d_2+e_2$ for each prediction, where $d_2$ is median prediction time and $e_2$ is fluctuation time of the prediction. To guarantee a smooth output, the following inequality needs to be satisfied:

$$d2+e2 \leq br \cdot A, br=1,2,3, \quad (1)$$

where br is the batch size used in prediction progress and A is the time interval constant. The neural network may be used to parallelly predict br outputs in one run by minimal increase in computational overhead if br is a small value (i.e. br=10). This is because when br is small, the input features data sizes are relatively small compared with the model parameters. In certain embodiments, the main time consumption may be in data parsing and transmission. The RealPRNet may take the audio features from $B_1$ every br·A ms and predicts br outputs $[h_t, h_{t-1}, \ldots]$. These predicted outputs may be stored in HMM tied-state buffer $B_2$. According to certain experiments, the value of br may be configured at 4 which can ensure that equation (1) is satisfied in 99% of the cases. FIG. 5 further shows network prediction time consumption distribution (dark gray) according to certain experiments. In certain embodiments, when there are br sub-buffers in $B_1$ with size m+n+1 each and contain audio frame features $f_{t-n-i}, f_{t-i}, \ldots, f_{t+m-1}$, since m forward audio frames are used to construct x, the process latency may be increased to m·A+br·A ms.

According to certain embodiments, the phoneme recognition process does not directly predict phoneme label but instead predicts HMM tied states since a combination of neural network and HMM decoder may further improve system performance. The predicted HMM tied-states in $B_2$ may be used as input to the HMM tri-phone decoder. For each time interval br·A, the decoder may take all the predicted data in $B_2$, calculate corresponding phonemes $[P_t, \ldots, P_{t-br+1}]$, and store the phonemes it in buffer $B_3$. The calculation time may be $d_3+e_3$ ($d_3$ being median calculation time and $e_3$ being fluctuation time of the calculation) and $B_3$ may depend on the number of previous states used to calculate the $[P_t, \ldots, P_{t-br+1}]$. The HMM decoder may improve prediction results by using previously predicted tied states together with the current state $h_t$ to calculate the corresponding phoneme $P_t$. In certain embodiments, the decoder may only use the tied state as a reference rather than relying on it as in a speech recognition system. This is because phoneme-to-phoneme may not have a strong inner logic relation as word-to-word. Accordingly, the decoder may be constructed with a bigram phoneme model which focuses on the acoustic part (signal to phoneme) of the process rather than the language part (phoneme-to-phoneme). According to experiments, calculation time for decoding is typically stable and always less than br·A. When accounting the latencies in the forgoing discussion, an overall latency from raw input audio signal to the corresponding output phoneme may be $(m+br) \cdot A+D+e_t$, where $D=d_1+d_2+d_3$ and $e_t=e_1+e_2+e_3$.

An additional buffer, $B_3$, may be used to control the final output of P of the phoneme recognition system. This output predicted phoneme with a timestamp may be stored into $B_3$. The method may continuously take the first phoneme from $B_3$ and use it as input to an animation step every A ms time interval. If a predicted phoneme with time stamp has negative $e_t$, i.e. $D+e_t<D$, the method may wait for A ms before de-queued output from $B_3$. If a predicted phoneme $P_{et}$ with time stamp has positive $e_t$, i.e. $D+e_t>D$ and the buffer contains no more phoneme, the method may output the last phoneme and store $P_{et}$ as the last phoneme in the buffer. $P_{et}$ may be used as an output if the next predicted phoneme also has a positive $e_t$. If the next predicted phoneme also has a positive $e_t$ does not have a positive $e_t$, the method may drop the $P_{et}$ and then output the next predicted phoneme after a time interval of A ms. With this approach, the phoneme recognition process may be able to have a stable output stream with time interval A ms and the overall latency from raw input audio signal to the corresponding output phoneme stream may be $(m+br) \cdot A+D$, where $D=d_1+d_2+d_3$. The stable output phoneme stream may be stored in a data buffer $B_4$. The following pseudo-code represents this process according to certain embodiments. The buffer is $B_3$, and output d_P is the output phoneme which is going to be stored in $B_4$.

```
while program is running
    Thread RealPRNet:
        if curtime == pre_time1 + a_t
            RealPRNet takes a x_t and produce P
            P_last = P
            buffer. enqueue (P)
    Thread output:
        if cur _time == pre_time2 + d_t:
            if buffer is empty:
                pre_time2 = cur_time
                output the p_last
            else:
                pre time2 = cur_time
                d_P = buffer.dequene ( )
                output d _P
        else:
            do nothing
```

Referring back to FIG. 2, Step S240 of the speech animation generation method is to produce an animation according to the recognized phoneme. In certain embodiments, the method may fetch data from data buffer $B_4$ and use the data to produce corresponding speech animation.

Figure 6:
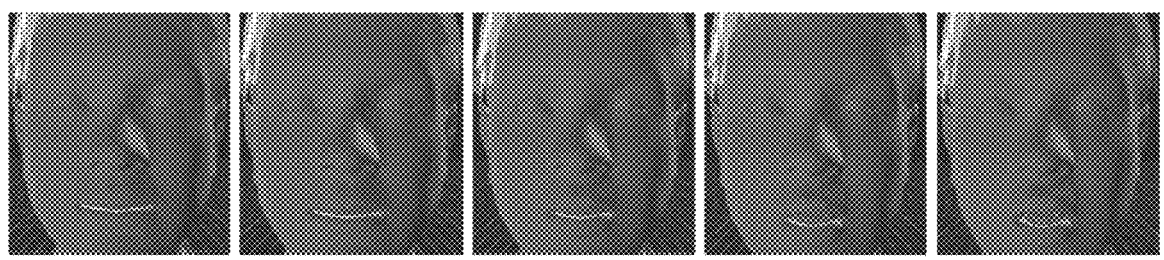
FIG. 6 shows an example of a phoneme corresponding viseme at different frames during the pronunciation of phoneme /o/.
Figure 7:
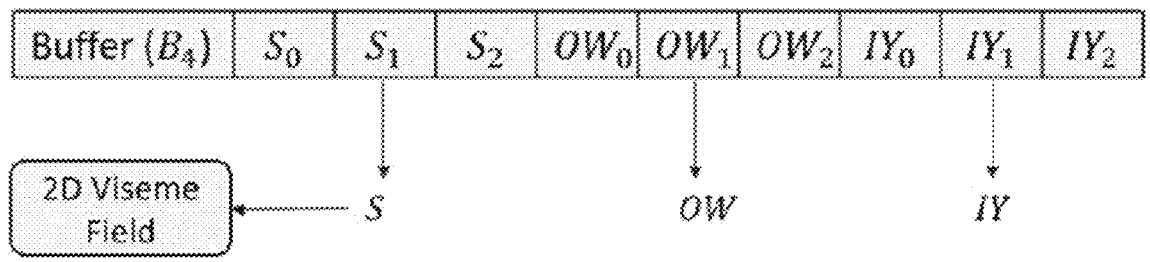
FIG. 7 shows an example of phoneme selection for generating 2D viseme field animation curve according to certain embodiments of the present disclosure.

For real-time speech animation, according to certain embodiments, the disclosed method may not directly use the output phoneme sequence from the phoneme recognition process because the output phoneme sequence predicts the phoneme for every audio frame with a time interval A. Thus, $B_4$ is used to select the appropriate next phoneme frame for the animation curve generation. FIG. 6 shows an example of a phoneme corresponding viseme at different frames during the pronunciation of phoneme /o/. FIG. 7 shows an example of phoneme selection for generating 2D viseme field animation curve according to certain embodiments. As shown in FIG. 7, a same phoneme may occur in different frames. The size of $B_4$ may correspond to an average single phoneme pronunciation time in the audio frame. The predicted phoneme outputted by the phoneme recognition process may be stored in buffer $B_4$ first. The phoneme pronunciation may be a dynamic progress, which means that the viseme phoneme at the beginning of the pronunciation may not be exactly same as the corresponding phoneme viseme as shown in FIG. 6. Thus, an appropriate phoneme frame should be selected from certain phoneme pronunciation frames to calculate the complete viseme's transformation time which is used for animation curve generation. For example, a phoneme frame represents the rightmost viseme frame in FIG. 6 in a sequence of phoneme /o/ frames. If a minimum recognizable phoneme pronunciation time in the data set is $pr_{min}$ audio frames and the length of the continuously predicted phoneme in the buffer is less than $pr_{min}$, then the corresponding phoneme may be replaced by the previous phoneme. Thus, the upcoming phoneme may be selected based on the following rules:

(a) The same phonemes are continuously appended to the buffer for at least $pr_{min}$ units.

(b) If the number of continuous phonemes is more than $pr_{min}$ units and less than the size of data buffer $B_4$. The appropriate frame that represents the phoneme is selected from that part of the buffer.

(c) If the number of the continuous phonemes is more than the size of $B_4$, all phonemes in the buffer are used to select the appropriate frame and no new frame is selected until the next different phoneme is appended to the buffer.

In most procedural methods using key frame viseme to produce a final animation, including the (Jaw and Lip) JALI viseme field and procedural lip-synchronization method, the phoneme is mapped to one fixed static viseme without any variation. However, based on observation of human speech behaviors, visemes corresponding to a phoneme may be slightly different in different situations. This may be true even when a current phoneme has sufficiently long pronunciation time to erase coarticulation of sound caused by a previous phoneme pronunciation. For example, the visemes that represent the phoneme /s/ is pronounced differently in 'things' and 'false' under a same speaking style. Thus, in certain embodiments of the present disclosure, the animation production process may be implemented using a modified form of a Jaw and Lip (JALI) viseme field and procedural lip-synchronization method.

Figure 8:
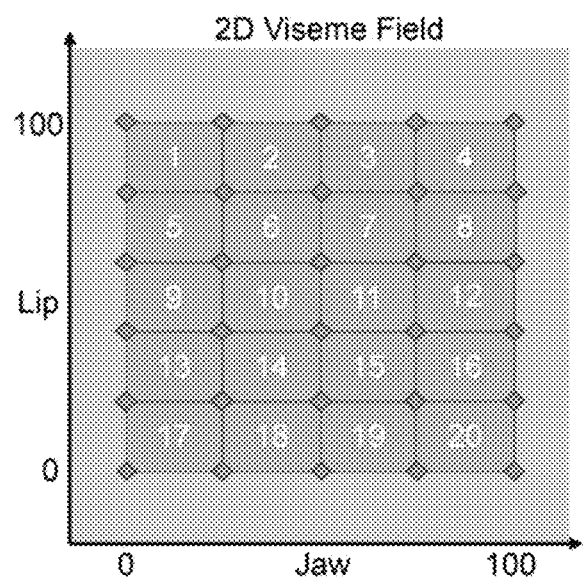
FIG. 8 illustrates a 2D viseme field divided into 20 blocks with block index.

According to certain embodiments of the present disclosure, a 2D viseme field is divided into different blocks. FIG. 8 illustrates a 2D viseme field divided into 20 blocks with block index. As shown in FIG. 8, each phoneme may correspond to a block region rather than a static point in the 2D field.

Figure 9:
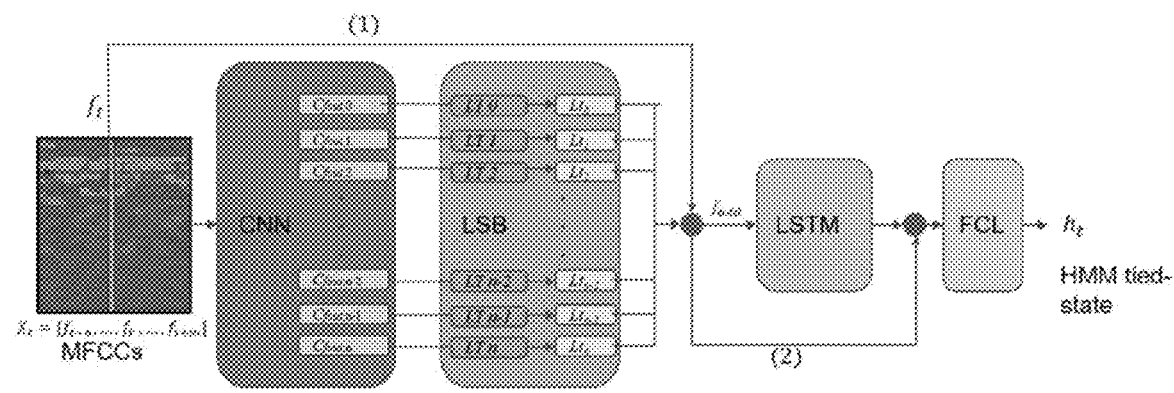
FIG. 9 illustrates an overall network architecture for RealPRNet according to certain embodiments.

According to certain embodiments, a neural network used in Step S230 may include several components. FIG. 9 illustrates an overall network architecture according to certain embodiments. As shown in FIG. 9, the network used for phoneme recognition may include one or more convolutional neural network (CNN) layers, a long short-term memory (LSTM) stack block, one or more unified LSTM layers, and a fully connected layer (FCL). The CNN layers take audio feature vector $x_t$ as input and apply frequency modeling on the audio features. An n-dimensional vector output of the CNN layers may be passed into an n-layer stacks of LSTMs for parallel and separate processing and temporal modeling. The output may be combined with the $f_t$ to form an input to additional LSTM layers for temporal modeling, and then goes through a fully connected layer. An HMM tri-phone decoder may be adopted to predict the phoneme label.

The CNN layers may be used for frequency modeling to reduce frequency variation. Based on the observation that voice of different people contains different ranges of frequencies even when they are speaking the same utterance, CNN layers may be used to provide improvement in frequency variations in be the audio feature.

CNN layers may also play a role in the temporal-spatial domain. Here, spatial refers to frequency-domain audio feature pattern detection and learning. The input feature contains frequency information since each coefficient in Mel-frequency cepstral is generated by passing-through different frequency filter banks. The CNN layers may include CNN filters. Each CNN filter may learn the different frequency patterns from the input features during training. According to certain embodiments of the present disclosure, a network architecture may be chosen for the CNN layers to emphasize the learned frequency patterns in the input features by separately connecting CNN output features (CNN$_{fout}$) of different CNN filters to different LSTM in the LSTM stack Block. For example, in certain embodiments, a first CNN layer may include a 9×9 frequency (spatial)-temporal filter and a second CNN layer may include a 3×3 filter. The first CNN layer may have 256 output channels and the second layer may have 16 output channels. Based on the observation that neither max nor average pooling in the CNN layers helps to improve performance of the neural-network processing, in certain embodiments, no pooling is configured in the CNN layers.

Figure 10:
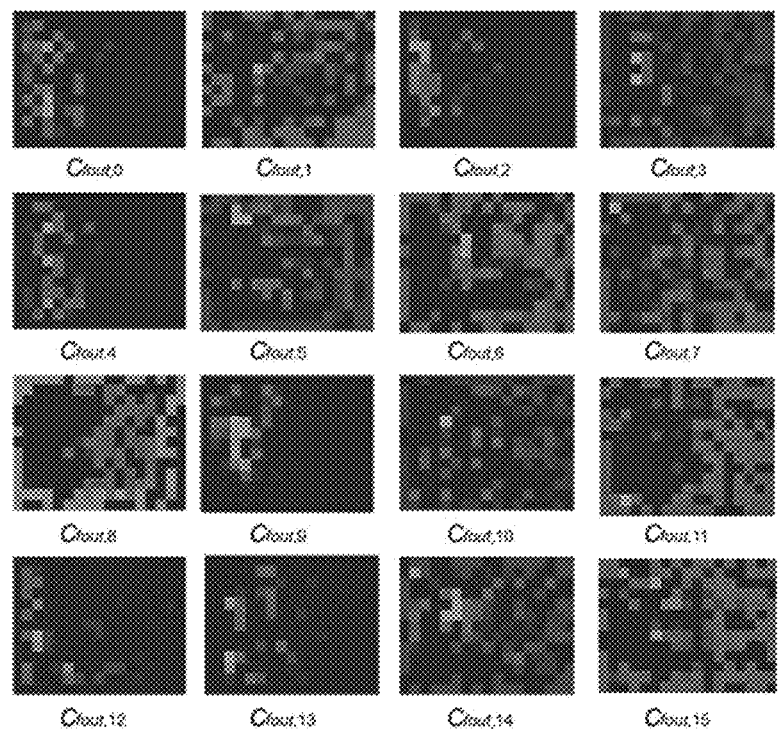
FIG. 10 illustrates audio feature outputs from CNN output channels according to certain embodiments.

After the CNN layers apply frequency modeling and the CNN filters learn the acoustic features from the input features, each CNN output channel may produce intermediate features. FIG. 10 illustrates outputs from CNN output channels. Subsequently, the LSB may perform temporal modeling via parallel processing on the intermediate features outputted by the CNN output channels.

Figure 11A:
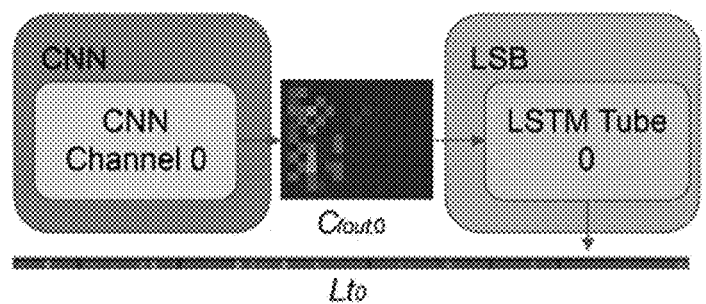
FIG. 11A illustrates a process in the LSB according to certain embodiments.
Figure 11B:
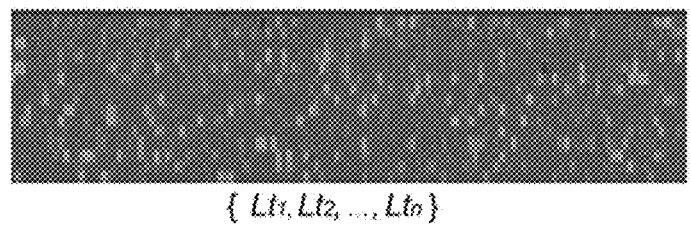
FIG. 11B illustrates a process in the LSB according to certain embodiments.

The CNN channels' outputs CNN$_{fout}$'s may be denoted by Equation 2, with $C_{fout,i}$ representing output from the $i^{th}$ channel. CNN$_{fout}$'s may be passed to a plurality of LSTM modules in the LSB. These LSTM modules may be termed as LSTM Tubes (LTs), and are illustrated in the LSB as shown in FIG. 9. The number of LTs inside the LSB depends on the number of the last CNN layer output channels, with one LT corresponding to each CNN output channel. An LT may be a relatively small and independent LSTM network. A LSTM network has memory cells to remember the information on previous features, and thus is advantageous in temporal modeling. In certain embodiments, each output $C_{fout,i}$ from a specific CNN channel may be viewed as a derivative feature of the original audio feature with context within a sliding window. Thus, separate temporal modeling may be applied to each different $C_{fout,i}$. FIG. 11A and FIG. 11B illustrate a process in the LSB according to certain embodiments. For example, FIG. 11A shows an example of the intermediate features CNN$_{fout}$'s being passed to LTs inside the LSB and the LTs producing corresponding LT outputs $Lt_n$'s. For example, $C_{fout,0}$ is passed to LT0, where "0" represents the CNN filter with index 0, inside the LSB for independent temporal modeling (as represented in Equation 3, where FCL(LSTM( . . . )) represents fully-connected-layer processing of the LSTM module) and the output feature is $Lt_0$. FIG. 11B shows aggregated LSB output features. As shown in FIG. 11B, the separate output features from the LTs may be aggregated together as the input feature for the next LSTM layer (as represented in Equation 4).

$$CNN_{fout} = \{C_{fout,1}, C_{fout,2}, \ldots, C_{fout,n}\} \quad (2)$$

$$Lt_n = FCL(LSTM(C_{fout,i})) \quad (3)$$

$$LSB(CNN_{fout}) = \{Lt_1, Lt_2, \ldots, Lt_n\} \quad (4)$$

In certain embodiments of the present disclosure, the LSB may contain 16 LTs, and each LT includes two LSTM layers and one fully connected layer (FCL). Each LSTM layer may be configured to have 512 hidden units and 0.3 dropout rate, and the FCL may have 128 output units.

It has been demonstrated that a LSTM layer may be advantageous in extracting temporal patterns in input feature space. Gate units in LSTM may be used to control information flows inside the LSTM. For example, an input gate may decide what information is added to a cell state. A forget gate may decide what information needs to be removed from the cell state and an output gate may decide what information can be used in the output. Thus, a LSTM network may selectively "remember" temporal features.

In certain embodiments of the present disclosure, after the LSB performs the parallel and separate temporal modeling, the output may be passed to additional unified LSTM layers for unified temporal modeling. In certain embodiments, 4 additional LSTM layers may be configured. Each additional LSTM layer may have 1024 hidden units, 512 output units and 0.2 dropout rate.

The output from the additional LSTM layers may be passed to a fully connected layer (FCL) that provides ability to mix output signals from all neurons in the previous layer, and shape output probabilities of each class so that the target class has a higher probability. In certain embodiments, the FCL may be implemented with softmax activation. In certain embodiments, the FLC may have 1024 hidden units and output an 1896-dimension vector which represents the possibility of 1896 HMM-GMM tied-states. The HMM tri-phone decoder takes the vector from the FLC as an input to predict a final phoneme label.

Figure 12:
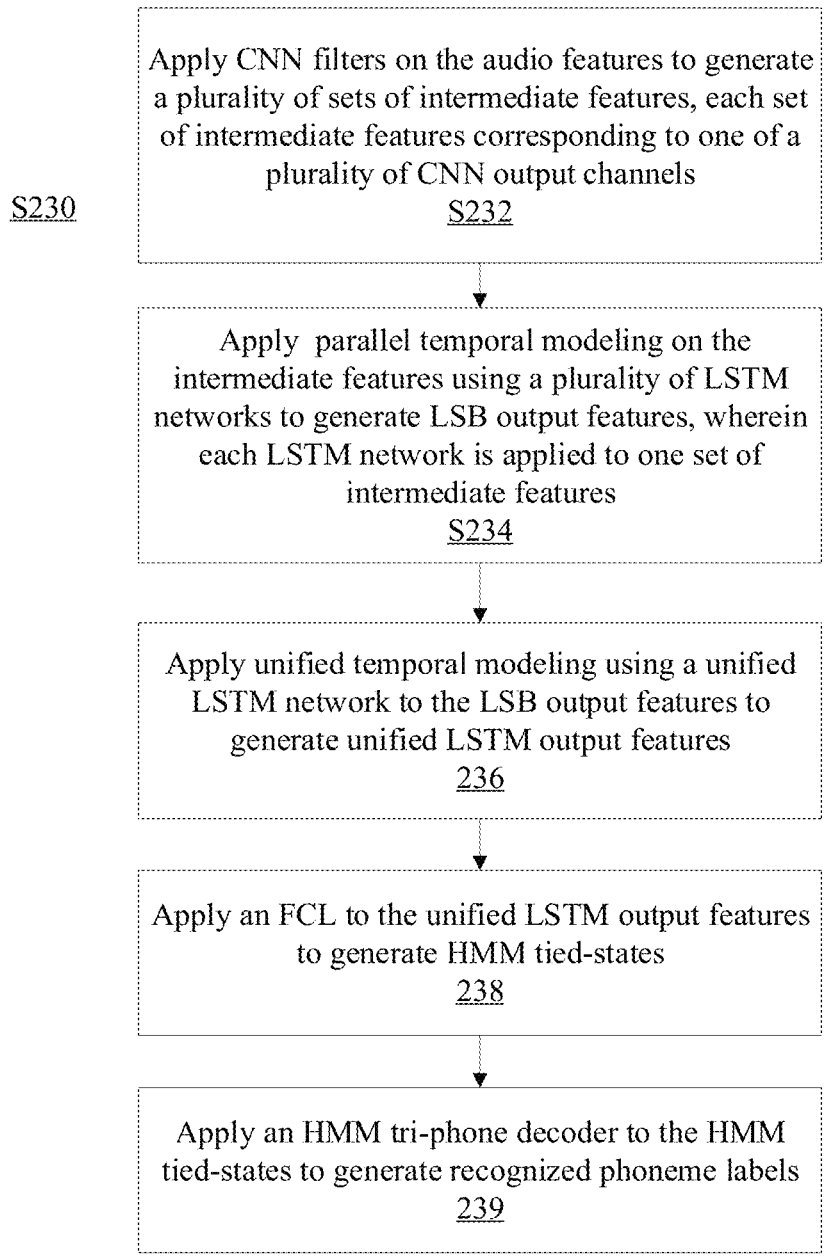
FIG. 12 illustrates steps of neural-network processing to predict phonemes from audio features according to certain embodiments.

To summarize the network components used in neural-network processing to predict phonemes according to certain embodiments, Step S230 of the speech animation generation method may include several steps. FIG. 12 shows the steps according to certain embodiments. As shown in FIG. 12, Step S232 is to apply CNN filters on the audio features to generate a plurality of sets of intermediate features, each set of intermediate features corresponding to one of a plurality of CNN output channels; Step S234 is to apply parallel temporal modeling on the intermediate features using a plurality of LSTM networks to generate LSB output features, wherein each LSTM network is applied to one set of intermediate features to generate a set of LSB output features; Step S236 is to apply unified temporal modeling using a unified LSTM network to the LSB output features to generate unified LSTM output features; Step S238 is to apply an FCL to the unified LSTM output features to generate HMM tied-states; and Step S239 is to apply an HMM tri-phone decoder to the HMM tied-states to generate recognized phoneme labels.

In a neural network, each layer may focus on different input. In automatic speech recognition (ASR) tasks, the lower layers (e.g., CNN layers in the RealPRNet) may focus more on speaker adaptation and higher layers (e.g., additional LSTM layers in RealPRNet) may focus more on discrimination. Thus, the input features of the different layers may be complementary to improve the network's performance. In certain embodiments of the present disclosure, two feature addition strategies have been adopted. The two addition strategies are illustrated in FIG. 9 through line (1) and line (2), where (1) represents the original frame feature, $f_t$, in $x_t$ combines with the LSB output and (2) represents the LSB output combines with the additional LSTM layer output.

The first features addition explores complementary information in short term feature $f_t$ and long-term feature output from LSB (which may be understood as high order representation of $x_t$). $x_t$ may be aggregated data using $f_t$ and its context features $[f_{t-n}, \ldots, f_{t-1}]$ and $[f_{t+1}, \ldots, f_m]$. However, an LSTM network may not consider different values in $f_t$ and its context features in prediction. Instead, the LSTM network may take all f's in $x_t$ as consecutive features and equally considers all the f's in $x_t$. By using the first feature addition, the importance of $f_t$ may be emphasized in $x_t$ when predicting $p_t$.

The second feature addition may check the LSB and the additional LSTM-layer outputs, including separated and unified complementary temporal feature information. These features may be viewed as high-order feature representations of $x_t$ with different pattern complementarity since network layers may focus on different information in $x_t$. The multi-scale feature addition demonstrates a positive effect on the network performance.

Performance of the method provided by the present disclosure according to certain embodiments has been evaluated. In particular, performance of the RealPRNet has been evaluated in three areas: (1) phoneme recognition accuracy, (2) subjective and objective speech animation quality, and (3) buffer occupancy dynamics to enable the real-time application.

Certain experimental results are conducted using the TIMIT data set. TIMIT is widely used for phoneme recognition evaluation. It contains 6300 sentences, consisting of 10 sentences spoken by 630 speakers each from 8 major dialect regions of the United States. Following a standard TIMIT set up, a standard TIMIT training set including 3696 utterances from 462 speakers, is used to train the neural network. The performance of the neural network is then evaluated on a TIMIT core test set which consists of 192 utterances.

The TIMIT s5 recipe is used to calculate phoneme duration in each utterance through force alignment technique and generate an HMM tied-state triphone model, the corresponding 1896 tied-states and their properties (i.e., state probability, transfer probability, corresponding phoneme, etc.). Subsequently, a tri-phone decoder with bigram phone model is used at the end of the neural network architecture which takes the tied-states stream as input and outputs a predicted phoneme stream. The output ground truth y for the corresponding input feature x in the training data set is the index of the HMM tied states. An audio to HMM tied-states force alignment is enabled. For network training, 10 epochs are configured as the minimum training epoch and early stop is enabled (if validate loss change in epochs is less than 0.001) during the training. An Adam optimizer is used in the first epoch and the momentum stochastic gradient descent (MSGD) optimizer for the rest epochs. The batch size is configured to be 256 for the first epoch and 128 for the rest. The learning rates are 0.01, 0.001, 0.0005, 0.0001 for the first four epochs, and 0.0001 for the rest of them. Weight initialization is used for the CNN layer's parameters and a 0.3 dropout rate us used for all the LSTM layers. A ReLU activation is applied to most of the layers except the final fully connected layer which used softmax. The performance of the network with a different m in the input feature is evaluated. In the experiments, value n in $x_t$ is set to m+1. Table 1 shows network parameters in the implementation.

TABLE 1

| | Network parameters | | | |
|---|---|---|---|---|
| | hidden units | output channels | output units | drop out rate | size of the window (ksize) |
| conv0 | | 256 channels | | | 9 |
| conv1 | | 16 channels | | | 3 |
| lsb0 | 1024 | | 128 | 0.3 | |
| lstm0 | 1024 | | 512 | 0.2 | |
| lstm1 | 1024 | | 512 | 0.2 | |
| lstm2 | 1024 | | 512 | 0.2 | |
| lstm3 | 1024 | | 512 | 0.2 | |
| fc0 | 1024 | | 1896 | | |

The standard TIMIT phoneme recognition evaluation error metric is used to evaluate the phoneme error rate (PER) of the RealPRNet. The original TIMIT data set uses 60 phonemes to create the dictionary. During the evaluation, the process first maps 60 phonemes to 39 phonemes, and then calculates the "Levenshtein distance" between the recognized phoneme sequence and the ground truth phoneme sequence. Levenshtein distance is a method to measure the difference between the two sequences. It calculates the minimum number of single-character edits (including insertions, deletions, and substitutions) required to change one sequence into another. The number of the edits required to change the recognized phoneme sequence into the ground truth phoneme sequence is first calculated followed by the ratio between this minimum number of edits and the whole phoneme sequence length. This ratio is the PER. Under real-time situation, the phoneme is predicted for each audio frame. Thus, the PER is calculated based on the audio frame level phoneme sequence in our evaluation.

A block distance error measures average distance between the trajectory curve in the viseme field produced by the recognized phoneme sequence and the curve produced by the ground truth phoneme sequence. The basic unit used here is the short edge of the 2D viseme field block. For each audio frame, the corresponding points on the two curves and the absolute distance between these two points are calculated, also known as Euclidean distance. Then the average distance between these two curves on each time t is calculated.

In an experiment, RealPRNet is compared with two other phoneme recognition systems: (1) a 4 layers LSTM with a feed-forward deep neural network architecture; and (2) a CLDNN that combines CNN, LSTM and fully connected deep-learning neural network (DNN). A performance of off-line phoneme recognition evaluation on TIMIT data set is shown in Table 2. The RealPRNet outperformed other methods in PER by up to 7.7%.

TABLE 2

| Off-line Phoneme Recognition Error Rate | |
|---|---|
| networks | off-line PER |
| lstm | 18.63 |
| cldnn | 18.30 |
| RealPRNet | 17.20 |

Figure 13:
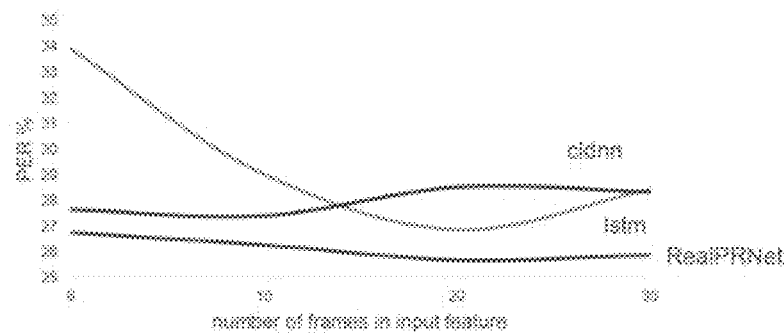
FIG. 13 illustrates a real-time performance comparison of LSTM, the CLDNN, and RealPRNet.

In FIG. 13, a real-time performance of the LSTM, the CLDNN, and the RealPRNet are compared. The x-axis in the figure represents the number of frames used in a single $x_t$ and the y-axis represents the phoneme error rate. As shown in FIG. 13, the LSTM has low performance when the temporal context information is insufficient (i.e., when itis aggregated by using less than 10 fs), but its performance improves continuously with the increasing of the $x_t$ value until a spot (20 audio frame features in $x_t$) is reached. According to FIG. 13, RealPRNet outperforms LSTM by up to 20% and CLDNN by up to 10%. The combination of frequency and temporal modeling enabled the RealPRNet a smooth performance across a various selection of the number of frames for $x_t$.

To understand the advantage of RealPRNet further, we considered two additional variations as follows: (1) RealPRNet without the LSTM layer. (2) CLDNN and RealPRNet without long short-term feature addition.

Figure 14:
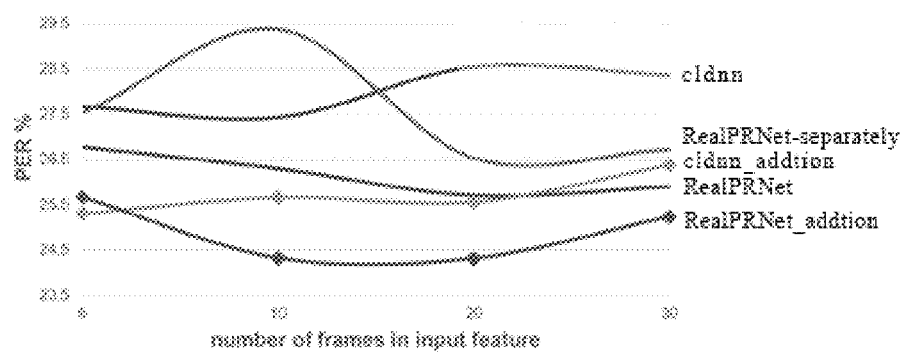
FIG. 14 illustrates a performance comparison of phoneme prediction methods according to phoneme error rate.

The RealPRNet applies two different types of temporal modeling to $x_t$, the separate temporal modeling performed by LSB and unified temporal modeling performed by the unifying LSTM layers. The difference between these two temporal modeling that affect the performance of the neural networks may be compared. In one experiment, the unified LSTM layer is removed from the RealPRNet and the resulting network is termed as 'RealPRNet-separate'. By comparing RealPRNet-separately and CLDNN, the result in FIG. 14 shows that the separate temporal modeling alone cannot outperform the unified temporal modeling. Thus, the performance of RealPRNet benefit from the two temporal modelings when used together. The PER of RealPRNet under different latency scenarios (different values m and n) shown in FIG. 14 illustrates that it outperforms both temporal modeling network architectures when used individually.

As illustrated in the previous section, the performance of the network can be further improved by multi-scale feature addition techniques. This technique may be demonstrated with the RealPRNet and compare its performance with the strongest baseline model CLDNN with feature addition structure and the previous networks without feature addition. As shown in FIG. 14, the performance of both RealPRNet and CLDNN with multi-scale feature addition has been improved. The additional short-term feature provides complementary information to the intermediate input features which forced the networks to focus on the current frame $f_t$. Thus, RealPRNet outperforms other networks in most of the latency scenarios. In particular, it may achieve an additional 4% relative improvement in real-time PER evaluation.

The quality of the output speech animation generated by the disclosed method is also evaluated. Trajectory curves in viseme field produced by the recognized phoneme streams predicted by various reference networks and RealPRNet are compared with a trajectory curve produced by the ground truth model. A block short edge length is used as a distance unit to calculate the difference between the recognized phoneme produced curve and the ground truth curve at each time instance.

Figure 15:
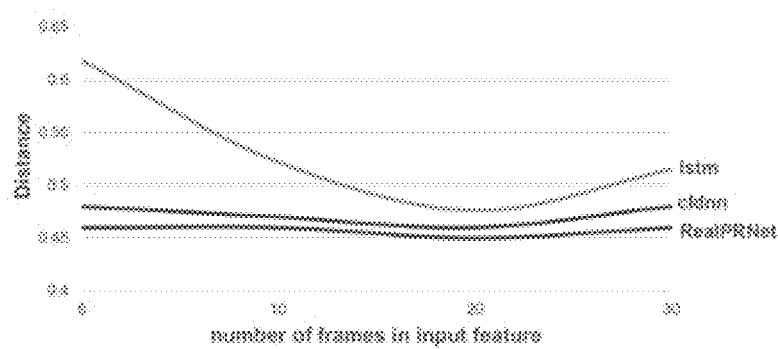
FIG. 15 shows a performance comparison of phoneme prediction methods according to block distance errors.
Figure 16:
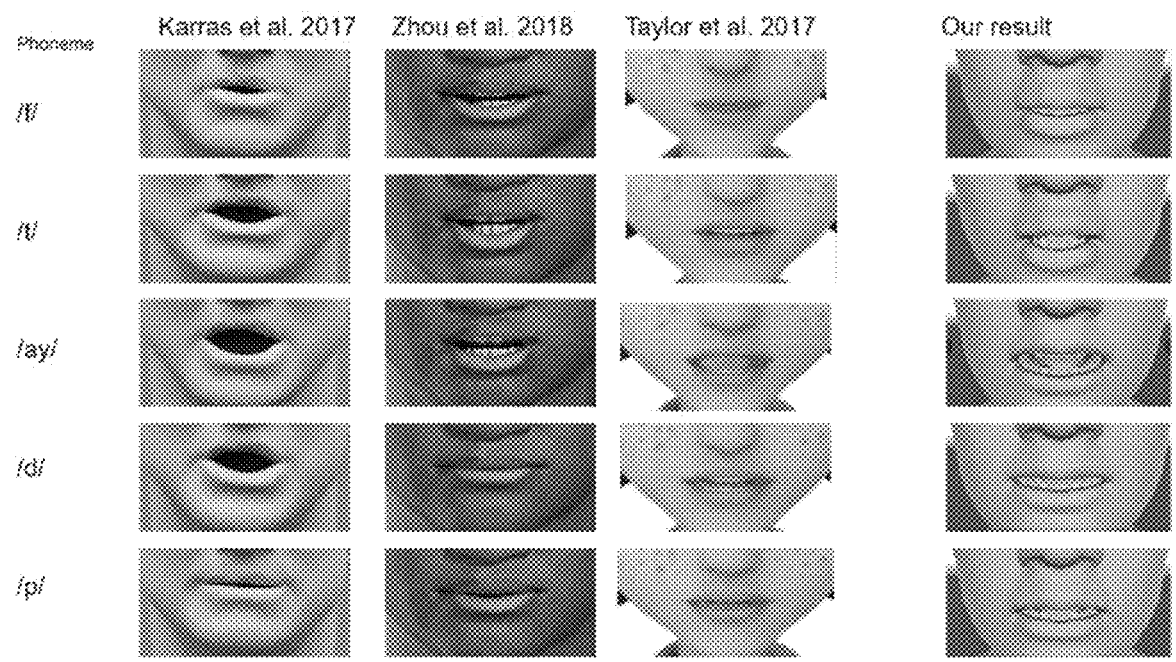
FIG. 16 shows a visual comparison of speech animation generation methods.

The comparison result is shown in FIG. 15. The x-axis in FIG. 15 represents the number of frames used in input features and the y-axis represents the block distance error in the basic unit. As shown in FIG. 15, the RealPRNet also achieves the minimum error under different latency scenarios, which is up to 27% less than other networks.

For subjective evaluation, viseme difference between the results from the method provided by the present disclosure and other state-of-the-art realistic speech animation methods are compared. The same audio is used to produce believable speech animation and a video is recorded. The videos from different methods are aligned with the same audio signal. Then screenshots of the viseme are taken at the same time to compare the viseme similarity visually. As shown in FIG.

16, all results are similar. Subjective tests are conducted by inviting subjects watching outcome animation videos side by side, and receive the same feedback.

Figure 17:
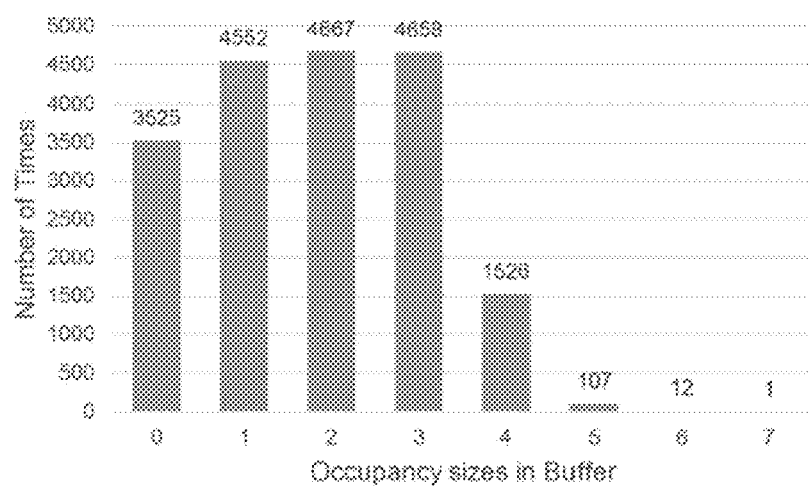
FIG. 17 illustrates output phoneme buffer occupancy according to certain embodiments of the present disclosure.

Buffer mechanism is used to stabilize system output and ensure that the delay of output is within a tolerance range. The occupancy status of $B_3$ of the experiment in runtime is shown in FIG. 17. In an ideal case, $[P_t, \ldots, P_{t-br+1}]$ is queued to the $B_3$ for every br×A ms, and $B_3$ dequeues the first values for every A ms. The $B_3$ occupancy status is recorded after every dequeue and the value of br is 4 in the experiment, thus $B_3$ occupancy sizes should be evenly distributed in [0,1,2,3]. In fact, 90% of the test cases are in this range which shows our method provided by the present disclosure can work in real-time situations. Most of the errors in $B_3$ occur in 0 and 4 because the computer program is unable to use the exact A in each step during the run time (e.g. the A fluctuated in a range from 10.3 ms to 11 ms). Other cases are caused by computational fluctuations of other parts of the phoneme recognition subsystems.

The present disclosure provides a device and a method for an audio-driven believable speech animation production framework with a new phoneme recognition neural network termed RealPRNet. The RealPRNet demonstrates improved performance against strong baseline model in phoneme recognition. The disclosed framework may be easily implemented in most of the existing virtual avatars without creating a new avatar. The real-human-like speech animation requires considerable effort on pre-train with both video and audio data, even post edit from the artist. The device and method provided by the present disclosure emphasize on producing believable real-time speech animation and simple implementation. These provided features may also allow a user to use online post effect editing.

The method and apparatus provided by the present disclosure according to the embodiments are described in detail above. The principles and implementation manners provided by the present disclosure are described herein by using specific examples. The description of the above embodiments is only used to help understand the method provided by the present disclosure. At the same time, a person skilled in the art will make changes the specific embodiments and the application scope according to the idea provided by the present disclosure. In summary, the contents of the present specification should not be construed as limiting the present disclosure.

The present disclosure contains material that is subject to copyright protection. The copyright is the property of the copyright holder. The copyright holder has no objection to the reproduction of patent documents or patent disclosure in the official records and files of the Patent and Trademark Office.

What is claimed is:

1. A method for generating speech animation from an audio signal, comprising:
   receiving the audio signal;
   transforming the received audio signal into frequency-domain audio features including:
     calculating mel-frequency cepstral coefficients (MFCCs) of the audio signal;
     calculating a first and a second derivative components of the MFCCs and aggregating the first and second derivative components into a single audio feature frame; and
     generating the audio features by aggregating the single audio feature frame with forward and backward contextual vectors of the single audio feature frame;
   performing neural-network processing on the frequency-domain audio features to recognize phonemes, wherein the neural-network processing is performed using a neural network trained with a phoneme dataset comprising audio signals with corresponding ground-truth phoneme labels, including:
     applying convolutional neural network (CNN) filters on the audio features to generate a plurality of sets of intermediate features, each set of intermediate features corresponding to one of a plurality of CNN output channels;
     applying parallel temporal modeling on the intermediate features using a plurality of long short-term memory (LSTM) networks to generate LSTM stack block (LSB) output features, wherein each LSTM network is applied to one set of intermediate features to generate a set of LSB output features;
     applying unified temporal modeling using a unified LSTM network to the LSB output features to generate unified LSTM output features;
     applying a fully connected layer (FCL) to the unified LSTM output features to generate hidden Markov models (HMM) tied states; and
     applying an HMM tri-phone decoder to the HMM tied-states to generate recognized phoneme labels; and
   generating the speech animation from the recognized phonemes.

2. The method according to claim 1, further comprising:
   storing the audio features in a first storage buffer;
   storing the HMM tied states in a second storage buffer; and
   storing the recognized phonemes in a third storage buffer;
   wherein the first storage buffer, the second storage buffer, and the third storage buffer are fixed size first in first out (FIFO) buffers.

3. The method according to claim 1, further comprising:
   generating a first combined feature by combining the single audio feature frame with the LSB output features; and
   using the first combined feature as input to the unified LSTM network to generate the unified LSTM output features.

4. The method according to claim 1, further comprising:
   generating a second combined feature by combining the LSB output features with the unified LSTM output features; and
   using the second combined feature as input to the FCL to generate the HMM tied states.

5. The method according to claim 1, wherein generating the speech animation from the recognized phonemes includes:
   generating a 2-dimensional (2D) viseme field and dividing the 2D viseme field into a plurality of blocks, wherein each recognized phoneme corresponds to a block of the 2D viseme field.

6. A device for generating speech animation from an audio signal, comprising:
   a memory, storing computer-executable instructions; and
   a processor, coupled with the memory and, when the computer-executable instructions being executed, configured to:
     receive the audio signal;
     transform the received audio signal into frequency-domain audio features;
     calculate mel-frequency cepstral coefficients (MFCCs) of the audio signal;

calculate a first and a second derivative components of the MFCCs and aggregating the first and second derivative components into a single audio feature frame;

generate the audio features by aggregating the single audio feature frame with forward and backward contextual vectors of the single audio feature frame;

perform neural-network processing on the frequency-domain audio features to recognize phonemes, wherein the neural-network processing is performed using a neural network trained with a phoneme dataset comprising audio signals with corresponding ground-truth phoneme labels;

apply convolutional neural network (CNN) filters on the audio features to generate a plurality of sets of intermediate features, each set of intermediate features corresponding to one of a plurality of CNN output channels;

apply parallel temporal modeling on the intermediate features using a plurality of long short-term memory (LSTM) networks to generate LSTM stack block (LSB) output features, wherein each LSTM network is applied to one set of intermediate features to generate a set of LSB output features;

apply unified temporal modeling using a unified LSTM network to the LSB output features to generate unified LSTM output features;

apply a fully connected layer (FCL) to the unified LSTM output features to generate hidden Markov models (HMM) tied states;

apply an HMM tri-phone decoder to the HMM tied-states to generate recognized phoneme labels; and generate the speech animation from the recognized phonemes.

7. The device according to claim 6, wherein the processor is further configured to:
store the audio features in a first storage buffer;
store the HMM tied states in a second storage buffer; and
store the recognized phonemes in a third storage buffer;
wherein the first storage buffer, the second storage buffer, and the third storage buffer are fixed size first in first out (FIFO) buffers.

8. The device according to claim 6, wherein the processor is further configured to:
generate a first combined feature by combining the single audio feature frame with the LSB output features; and
use the first combined feature as input to the unified LSTM network to generate the unified LSTM output features.

9. The device according to claim 6, wherein the processor is further configured to:
generate a second combined feature by combining the LSB output features with the unified LSTM output features; and
use the second combined feature as input to the FCL to generate the HMM tied states.

10. The device according to claim 6, wherein the processor is further configured to:
generate a 2-dimensional (2D) viseme field and dividing the 2D viseme field into a plurality of blocks, wherein each recognized phoneme corresponds to a block of the 2D viseme field.

11. A non-transitory computer-readable storage medium storing a plurality of instructions, wherein when the plurality of instructions are executed by a processor, cause the processor to:

receive the audio signal;
transform the received audio signal into frequency-domain audio features;
calculate mel-frequency cepstral coefficients (MFCCs) of the audio signal;
calculate a first and a second derivative components of the MFCCs and aggregating the first and second derivative components into a single audio feature frame; and
generate the audio features by aggregating the single audio feature frame with forward and backward contextual vectors of the single audio feature frame;
perform neural-network processing on the frequency-domain audio features to recognize phonemes, wherein the neural-network processing is performed using a neural network trained with a phoneme dataset comprising audio signals with corresponding ground-truth phoneme labels;
apply convolutional neural network (CNN) filters on the audio features to generate a plurality of sets of intermediate features, each set of intermediate features corresponding to one of a plurality of CNN output channels;
apply parallel temporal modeling on the intermediate features using a plurality of long short-term memory (LSTM) networks to generate LSTM stack block (LSB) output features, wherein each LSTM network is applied to one set of intermediate features to generate a set of LSB output features;
apply unified temporal modeling using a unified LSTM network to the LSB output features to generate unified LSTM output features;
apply a fully connected layer (FCL) to the unified LSTM output features to generate hidden Markov models (HMM) tied states;
apply an HMM tri-phone decoder to the HMM tied-states to generate recognized phoneme labels; and
generate the speech animation from the recognized phonemes.

12. The non-transitory computer-readable storage medium according to claim 11, wherein the plurality of instructions further cause the processor to:
store the audio features in a first storage buffer;
store the HMM tied states in a second storage buffer; and
store the recognized phonemes in a third storage buffer;
wherein the first storage buffer, the second storage buffer, and the third storage buffer are fixed size first in first out (FIFO) buffers.

13. The non-transitory computer-readable storage medium according to claim 11, wherein the plurality of instructions further cause the processor to:
generate a first combined feature by combining the single audio feature frame with the LSB output features; and
use the first combined feature as input to the unified LSTM network to generate the unified LSTM output features.

14. The non-transitory computer-readable storage medium according to claim 11, wherein the plurality of instructions further cause the processor to:
generate a second combined feature by combining the LSB output features with the unified LSTM output features; and
use the second combined feature as input to the FCL to generate the HMM tied states.

* * * * *